(12) United States Patent
Spencer et al.

(10) Patent No.: US 12,301,684 B2
(45) Date of Patent: May 13, 2025

(54) USER ACTIVITY RECOMMENDATION

(71) Applicant: Microsoft Technology Licensing, LLC, Redmond, WA (US)

(72) Inventors: Herrick Heath Spencer, Woodinville, WA (US); Baldwin Siu-Yan Ng, Bellevue, WA (US); Trina Singha Roy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/205,307

(22) Filed: Jun. 2, 2023

(65) Prior Publication Data

US 2024/0406280 A1    Dec. 5, 2024

(51) Int. Cl.
*G06F 15/173*  (2006.01)
*G06F 9/451*  (2018.01)
*H04L 67/50*  (2022.01)

(52) U.S. Cl.
CPC ............ *H04L 67/535* (2022.05); *G06F 9/453* (2018.02)

(58) Field of Classification Search
None
See application file for complete search history.

(56) References Cited

U.S. PATENT DOCUMENTS

2013/0042007 A1* 2/2013 Linton .................. G06Q 10/10
                                                    709/226
2021/0019215 A1* 1/2021 Neeter ............ G06Q 10/06316

* cited by examiner

*Primary Examiner* — Wing F Chan
*Assistant Examiner* — Andrew Woo (57) ABSTRACT

In examples, a user activity recommendation is generated for troubleshooting and/or for improving user understanding of software and/or hardware functionality. In examples, implicit and/or explicit user signals are evaluated to identify a set of actions associated with a task being performed by the user, such that the set of actions are evaluated to determine whether one or more actions can be recommended to the user to facilitate completion of the user's task accordingly. For instance, a recommended action may resolve an issue encountered by the user and/or may enable the user to complete the task more quickly, among other examples. Thus, as a result of generating and providing a user activity recommendation, user frustration may be reduced, user productivity may be increased, technical support may be provided more quickly, and guidance may be provided even in instances where such guidance was not provided by a third-party software developer.

20 Claims, 8 Drawing Sheets

USER ACTIVITY RECOMMENDATION

BACKGROUND

A user may seek technical support to resolve an issue or to better understand how to operate a computing device. However, given variability across devices, software developers, and/or user experience paradigms, it may be difficult for the user to obtain consistent technical support, especially from third parties. These and other difficulties may thus contribute to user frustration and detract from user satisfaction, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to user activity recommendation. For example, a user activity recommendation is generated for troubleshooting and/or for improving user understanding of software and/or hardware functionality. In examples, implicit and/or explicit user signals are evaluated to identify a set of actions associated with a task being performed by the user, such that the set of actions are evaluated to determine whether one or more actions can be recommended to the user to facilitate completion of the user's task accordingly. For instance, a recommended action may resolve an issue encountered by the user and/or may enable the user to complete the task more quickly, among other examples. Thus, as a result of generating and providing a user activity recommendation, user frustration may be reduced, user productivity may be increased, technical support may be provided more quickly, and guidance may be provided even in instances where such guidance was not provided by a third-party software developer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user seeks technical support, for example to resolve an issue or to better understand how to operate a computing device, among other examples. However, given variability across devices, software developers, and/or user experience paradigms, it may be difficult for the user to obtain consistent technical support. For example, a developer of an operating system and/or of a first-party application may provide documentation and/or technical support via a first data source (e.g., a website and/or a built-in user assistance application), while each third party may provide support via any of a variety of other data sources (e.g., a website of the third party, an online message board, and/or a support account or e-mail address). In other examples, a developer provides little or no documentation or technical support, such that a user is unable to find documentation and/or technical support for associated software/hardware. Such variability and/or inaccessibility of documentation and/or technical support may contribute to user frustration and/or detract from user satisfaction, especially since the user is likely to be met with such challenges after already encountering the need for technical support.

Accordingly, aspects of the present disclosure relate to generating a user activity recommendation, for example for troubleshooting and/or for improving user understanding of software and/or hardware functionality. In examples, implicit and/or explicit user signals are evaluated to identify a set of actions associated with a task (also referred to herein as a "task path"), such that the set of actions are evaluated to determine whether one or more actions can be recommended to the user, thereby facilitating completion of the user's task accordingly. For instance, a recommended action may resolve an issue that was encountered by the user and/or may enable the user to complete the task more quickly, among other examples.

It will be appreciated that any number of implicit and/or explicit signals may be processed according to aspects of the present disclosure, including, but not limited to, a screen recording (e.g., including a video and/or a set of screenshots) and/or telemetry data. For example, a screen recording is processed using a generative machine learning model to derive one or more user activity signals therefrom. As an example, a multimodal generative model is used to process image data of the screen recording and generate a textual and/or programmatic description therefrom. Use of such a generative machine learning model may improve recommendation performance, even in instances where different languages, user interfaces (e.g., as a result of changes to design and/or theme), and/or input techniques (e.g., touch input, mouse input, and/or keyboard input) are used, among other examples. As another example, telemetry data may indicate user interaction with a user interface element (e.g., actuation of a button, input to a text field, selection from a dropdown) and/or other aspects of a user interface (e.g., scrolling and/or zooming in/out).

In examples, a path data store includes one or more task paths that are each associated with completing a task. For example, a first task path and a second task path may each be associated with completing a given task. A task path within the task data store may be represented as a set of nodes and edges, where each node is associated with one or more actions and edges indicate an order for the nodes. In some examples, at least a part of the first task path and the second task path are the same, such that one or more nodes are shared between both the first task path and the second task path. For instance, a node may be associated with two other nodes, where one of the branched nodes is associated with the first task path and the other branched node is associated with the second task path.

As another example, a task path is associated with a type of device (e.g., a mobile computing device versus a laptop/desktop computing device) and/or one or more input types (e.g., a mouse and keyboard versus touchscreen input), among other examples. Thus, a task path may be identified based on these and/or other criteria, for example based on a user preference (e.g., indicating a preference for mouse navigation over keyboard navigation, or vice versa), based on available hardware of the computing device (e.g., whether a touchpad or a mouse is available), and/or based on accessibility considerations.

In examples, one or more task paths of a path data store are matched to a task being performed by the user, such that the identified task path(s) are used to generate a user activity recommendation according to aspects described herein. For example, the one or more task paths are identified based on determining implicit/explicit user activity signals indicate a task path that at least partially overlaps with a task path of the path data store.

As an example, if it is determined that a user's current task path has diverged from a task path of the path data store, an indication of a user activity recommendation may be provided to the user, such that the user may perform an action based on the recommendation and thus take action to return to the task path accordingly. Similarly, a recommendation may be generated based on a subsequent node of the task path (e.g., even without determining user activity has diverged from the task path). In some instances, a user activity recommendation is generated based on determining that a task path has been identified with a degree of certainty above a predetermined threshold. For instance, as user activity signals accrue, confidence of a corresponding task path may increase until it exceeds such a threshold. As a result, the user performs actions defined by the task path, thereby completing the user's task successfully.

Additionally, or alternatively, user input may indicate an intent that corresponds to a task, such that one or more corresponding task paths are identified from the path data store accordingly. For instance, the user may provide natural language input that is processed to identify one or more corresponding task paths accordingly. As an example, a machine learning model is used to process the natural language input to generate an intent and/or a task associated therewith, such that one or more task paths are identified from the path data store. As a further example, the machine learning model is a generative machine learning model that is prompted based on the content of the path data store, thereby providing context to the generative machine learning model that induces the model to generate model output corresponding to the path data store accordingly.

As another example, a set of positive task paths (e.g., that would result in successful task completion) and a set of negative task paths (e.g., that would not result in successful task completion and/or that result in task completion with reduced efficiency) are used to train a machine learning model, such that the machine learning model is used to classify a subsequent task path (e.g., corresponding to a set of user activity signals) as being a positive or a negative path. Further, the machine learning model may be used to generate one or more subsequent actions for a given task path, which may thus be used to provide a user activity recommendation accordingly.

Figure 1:
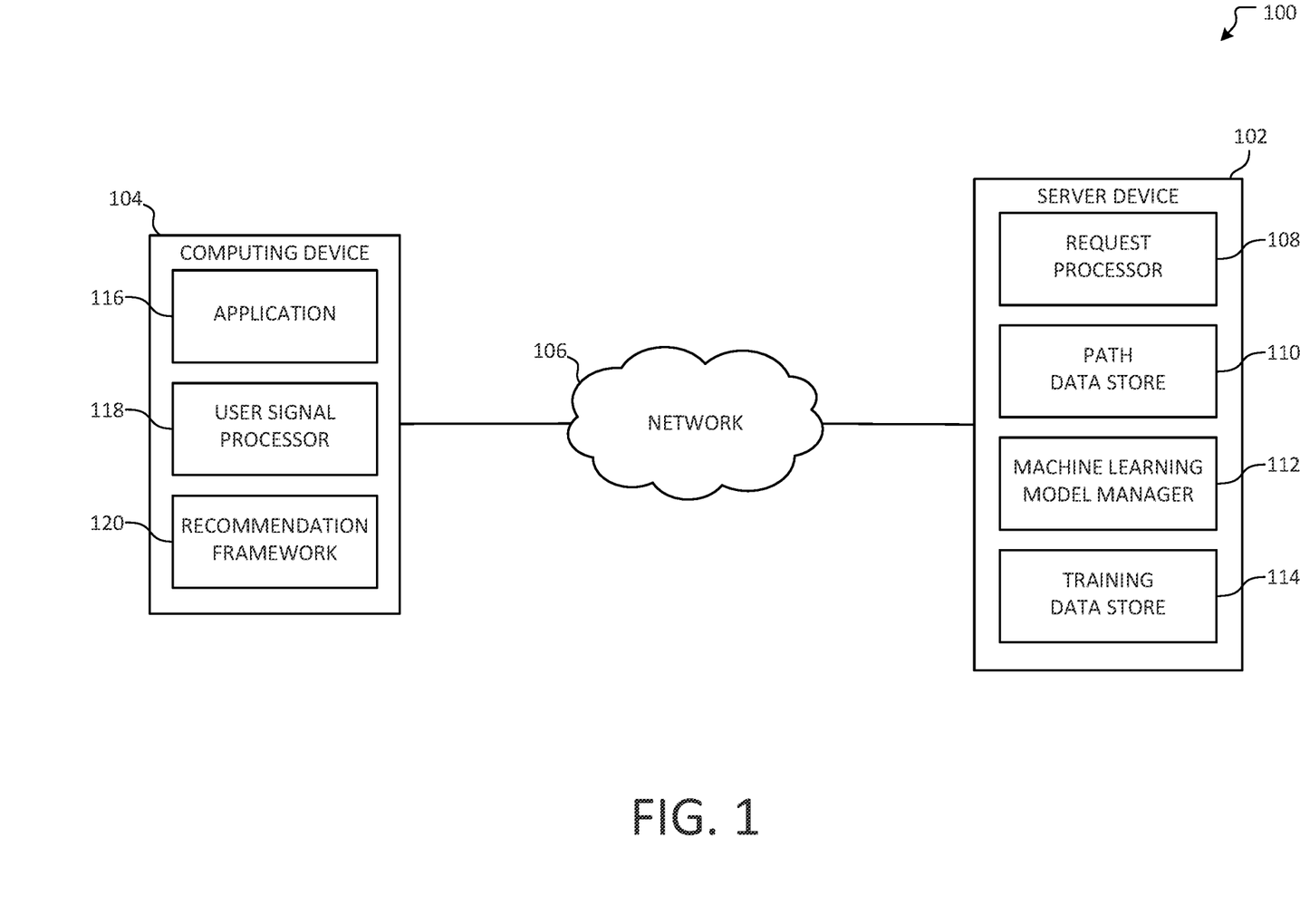
FIG. 1 illustrates an overview of an example system for generating a user activity recommendation according to aspects described herein.

FIG. 1 illustrates an overview of an example system 100 for generating a user activity recommendation according to aspects described herein. As illustrated, system 100 includes server device 102, computing device 104, and network 106. In examples, server device 102 and computing device 104 communicate via network 106, which may comprise a local area network, a wireless network, or the Internet, or any combination thereof, among other examples.

Computing device 104 may include any of a variety of computing devices, including, but not limited to, a tablet computing device, a mobile computing device, a laptop computing device, or a desktop computing device, among other examples. As illustrated, computing device 104 includes application 116, user signal processor 118, and recommendation framework 120. As noted above, the disclosed aspects may be used for any of a variety of software, such that application 116 may be a native application, a web-based application, or a hybrid application, among other examples.

In examples, a user of computing device 104 provides user input to initiate a feedback session (e.g., for troubleshooting application 116), during which user signals are captured (e.g., by user signal processor 118) and processed to generate a user activity recommendation (e.g., by recommendation framework 120) according to aspects described herein. As another example, a user of computing device 104 provides an indication to enable user activity recommendations, such that a user activity recommendation is proactively generated in response to identifying a task path (e.g., from path data store 110) corresponding to a task being performed by the user. Thus, a user activity recommendation may be generated in response to an explicit indication (e.g., to initiate a feedback session) or an implicit indication (e.g., identifying corresponding user activity signals after a preference indication from a user), among other examples.

While system 100 is illustrated as an example in which user activity signals associated with application 116 are captured and processed, it will be appreciated that any of a variety of additional or alternative user signals may be processed in other examples. For example, user activity signals corresponding to multiple applications and/or to an operating system of computing device 104 may be processed, among other examples. In some instances, user signal processor 118 and/or recommendation framework 120 are part of or are otherwise integrated into application 116. As another example, user signal processor 118 and/or recommendation framework 120 are provided as part of an operating system, among other examples.

User signal processor 118 captures user activity signals according to aspects described herein (e.g., in response to initiating a feedback session or based on a user preference indication to enable such functionality). As an example, user signal processor 118 processes a screen recording to derive one or more user activity signals therefrom (e.g., an actuation of a user interface element, text input into a text field, or scrolling/zooming content). As noted above, user signal processor 118 processes screen recording data using a generative machine learning model in some examples, for instance to generate a textual and/or programmatic description of image data. Additionally, or alternatively, user signal processor 118 obtains telemetry data (e.g., from application 116 and/or from an operating system), from which one or more user signals are derived accordingly. While example implicit and/or explicit user activity signals are described, it will be appreciated that any of a variety of additional or alternative user activity signals may be used in other examples.

Recommendation framework 120 processes user activity signals from user signal processor 118 to generate a task path therefrom. As noted above, a task path includes nodes and edges, where each node has one or more associated actions and nodes are interrelated by edges, thereby indicating an order for each set of actions associated with each node. For instance, a first node may include the action of opening a menu of application 116, while a second node includes an action of selecting a menu item from the menu. Additional or alternative example actions include, but are not limited to, opening a new window, closing a window, launching an application, closing an application, highlighting content, inputting content, and/or removing content. Further, as noted above, an action may be performed in a variety of ways, for example using a mouse, a keyboard, a touchscreen, or a combination thereof, among other examples.

Recommendation framework 120 processes a generated task path to determine whether there is a preexisting task path (e.g., from path data store 110) that corresponds to the user's current task path. It will be appreciated that, in other examples, computing device 104 additionally or alternatively includes a path data store, for example to provide user-specific task paths and/or for security/privacy considerations, among other examples.

As noted above, one or more relevant task paths may be identified by comparing nodes of the user's current task path to nodes of path data store 110. In examples, additional user input is received by recommendation framework 120, for example including natural language input (e.g., as text or audio) that indicates a user intent from which a task can be determined accordingly. In such examples, the determined task may be used to identify one or more task paths corresponding to the task path, thereby narrowing candidates with which the user's current task path is evaluated. A task path from path data store 110 may thus be used to determine whether the user has deviated from a positive task path (e.g., that would result in successful task completion)

Additionally, or alternatively, recommendation framework 120 processes the user's current task path using a machine learning model (e.g., as may have been trained by machine learning model manager 112 using training data from training data store 114), for example to classify the task path as either a positive task path or a negative task path. As another example, a generative machine learning model is used to generate a subsequent node based on the user's current task path. In such an example, an indication of the user's task path may be provided to a machine learning service (not pictured) and/or such machine learning processing may be performed by computing device 104, among other examples.

As a result, recommendation framework 120 determines one or more recommended actions corresponding to a subsequent node for the user's task path. In examples, multiple subsequent nodes are determined/generated, for example to provide an indication to a user of a set of actions that will result in task completion. The set of actions are provided to the user as a user activity recommendation. It will be appreciated that a user activity recommendation may include any of a variety of output, including, but not limited to, natural language output (e.g., as text that is displayed to the user and/or as audio output that is played to the user), as a tutorial video that includes a graphical representation of a user interface and corresponding actions, and/or as one or more tooltips that are displayed in association with corresponding user interface elements with which the user is to interact. In some examples, presenting the user activity recommendation may include automatically performing one or more of the actions on behalf of the user.

It will be appreciated that any of a variety of additional or alternative techniques may be used to present a user activity to a user according to aspects described herein. Further, while examples are described in the context of an end user (e.g., of application 116), it will be appreciated that similar techniques may be used for other types of users, such as for a developer. For instance, an indication of where user task paths diverge from a positive task path may be provided to the developer, such that the developer may change a user interface provided by application 116 accordingly, thereby improving the provided user experience.

System 100 is further illustrated as including server device 102, which includes request processor 108, path data store 110, machine learning model manager 112, and training data store 114. In examples, request processor 108 aggregates user paths from computing devices (e.g., computing device 104). In some examples, aggregated paths are stored in training data store 114, such that machine learning model manager 112 uses them as training data with which to train a machine learning model as described herein. Path data store 110 includes positive paths (e.g., as may be determined from training data store 114 and/or manually annotated), which may be provided by request processor 108 for use by recommendation framework 120 as described above. While example aspects are described with respect to server device 102 and computing device 104, it will be appreciated that similar aspects may additionally, or alternatively, be implemented by computing device 104 and server device 102, respectively.

Figure 2A:
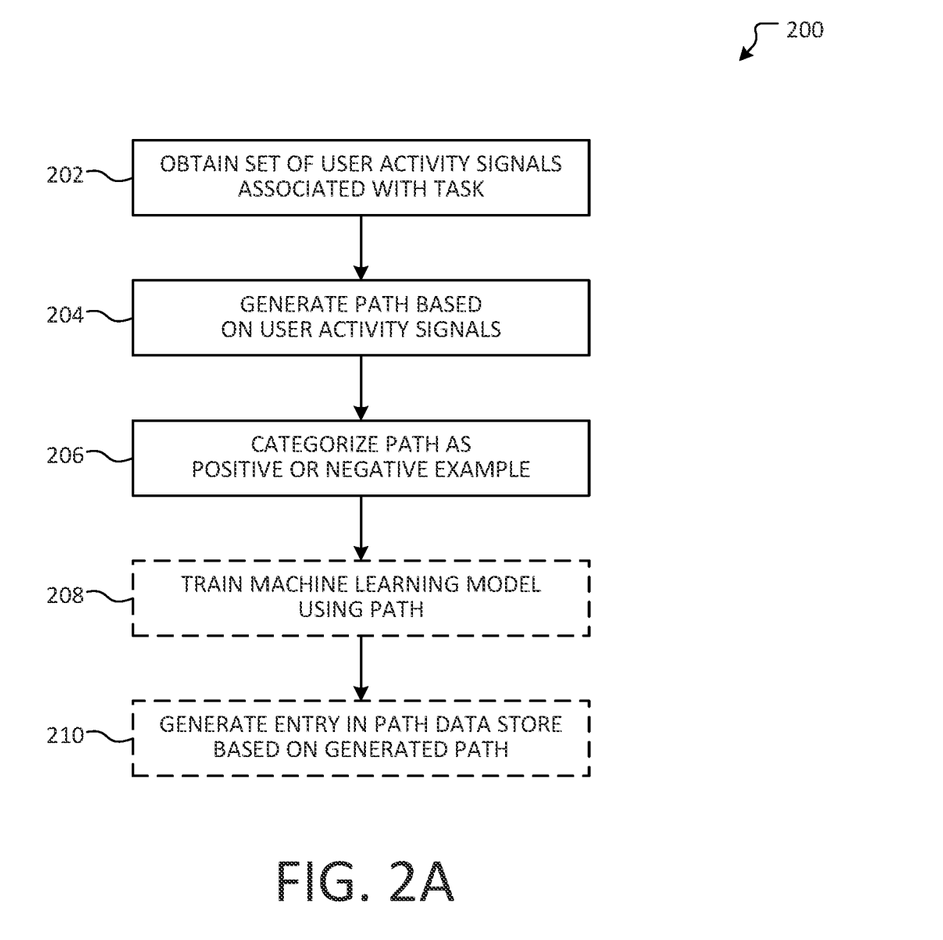
FIG. 2A illustrates an overview of an example method for processing a set of user activity signals to maintain a training data store and/or path data store according to aspects described herein.

FIG. 2A illustrates an overview of an example method 200 for processing a set of user activity signals to maintain a training data store and/or path data store according to aspects described herein. In examples, aspects of method 200 are performed by a request processor and/or a machine learning manager, such as request processor 108 and machine learning model manager 112, respectively, discussed above with respect to system 100 in FIG. 1.

As illustrated, method 200 begins at operation 202, where a set of user activity signals associated with a task are obtained. As noted above, the user activity signals may include a screen recording and/or telemetry data, among other examples. In examples, the user activity signals are received from a signal processor of a computing device, such as user signal processor 118 of computing device 104 in FIG. 1. For example, the set of user activity signals may be received in response to a user of the computing device initiating a feedback session and/or enabling proactive user activity recommendations, among other examples.

Flow progresses to operation 204, where a task path is generated based on the obtained set of user activity signals. Such aspects may be similar to those discussed above with respect to user signal processor 118 of FIG. 1 and are therefore not necessarily redescribed in detail. For example, one or more frames of a screen recording may be processed using a generative model to yield a natural language and/or programmatic description of the screen recording. The task path generated at operation 204 includes a set of nodes and a set of edges that represent actions performed by the user. While examples are described in which a task path includes only user actions, it will be appreciated that, in some examples, a task path further includes an indication as to an anticipated or an observed result of the one or more actions, such that it may be determined whether an action resulted in the expected result.

Method 200 is illustrated as an example where user activity signals are processed at a computing device that further trains a machine learning model and/or maintains a path data store. With reference to FIG. 1, server device 102 may further include a user signal processor (e.g., user signal processor 118) or computing device 104 may further include path data store 110, machine learning model manager 112, and/or training data store 114. As another example, it will be appreciated that a task path may be generated client-side (e.g., by computing device 104), such that the resulting task path is received instead of processing the signals and generating the task path at operations 202 and 204, respectively.

Moving to operation 206, the task path that was generated at operation 204 is categorized as either a positive example or a negative example. As noted above, a machine learning model may be trained based on positive and negative example task paths relating to any of a variety of tasks, thereby enabling the machine learning model to classify a subsequent task path. Additionally, or alternatively, operation 206 comprises soliciting user input to annotate the task path accordingly. As another example, an indication of whether the task path was successful in completing the task is obtained at operation 202 and/or it may be assumed that the task path is a negative example if the task path was received as a result of a feedback session initiated by a user. Thus, it will be appreciated that any of a variety of techniques may be used to categorize the task path according to aspects described herein.

At operation 208, a machine learning model is trained using the categorized path. For example, a machine learning model that was applied at operation 206 may be updated or finetuned based on the categorized path. As another example, a different machine learning model is trained. For example, an initial machine learning model may be used to categorize the path at operation 206 (e.g., relating to a different task than the task associated with the categorized path), while the different machine learning model (e.g., relating to the task associated with the categorized path) is trained using the categorized path accordingly. This may reduce the extent to which paths are manually annotated. While example training aspects are described, it will be appreciated that training data comprising one or more such task paths may be used in association with any of a variety of other machine learning models.

At operation 210, an entry in a path data store (e.g., path data store 110 in FIG. 1) is generated based on the task path. For example, if the task path is categorized as a positive example, the task path is added to the path data store as a positive example associated with a given task. In examples, adding the task path comprises updating an existing task path within the path data store, as may be the case when at least a part of the task path overlaps or otherwise corresponds to a part of a preexisting task path in the path data store. In such an example, nodes that are different may be added, where one of the added nodes is thus associated with a preexisting node via an additional edge, such that the preexisting node is associated with both the new set of nodes and a preexisting set of nodes.

Operations 208 and 210 are provided using dashed lines to indicate that, in some examples, operation 208 and/or operation 210 may be omitted. For example, new task paths may be added to a path data store without updating a machine learning model, or vice versa. Thus, method 200 may terminate at operation 206, operation 208, or operation 210.

Figure 2B:
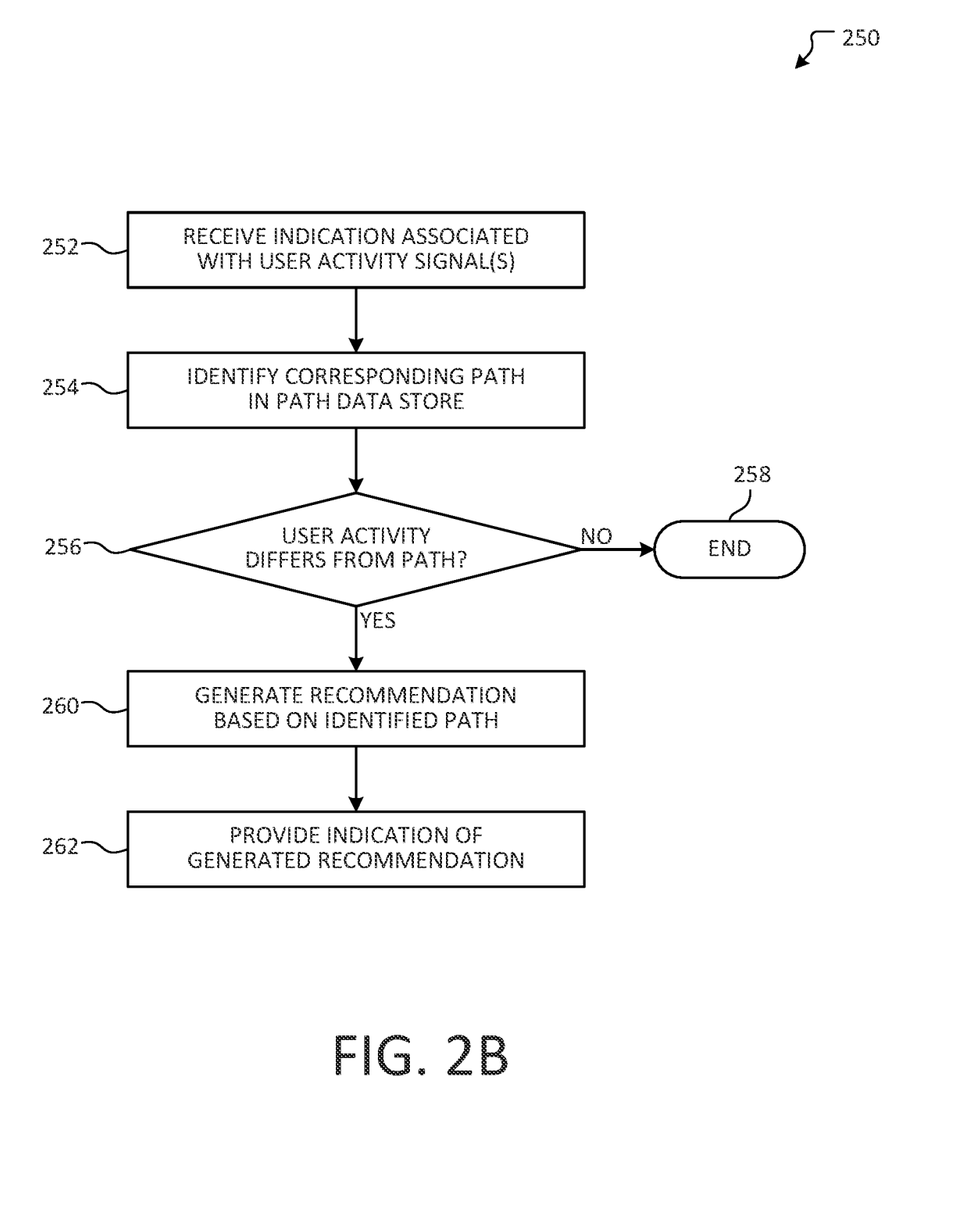
FIG. 2B illustrates an overview of an example method for generating a user activity recommendation based on a path data store according to aspects described herein.

FIG. 2B illustrates an overview of an example method 250 for generating a user activity recommendation based on a path data store according to aspects described herein. In examples, aspects of method 250 are performed by a recommendation framework, such as recommendation framework 120 in FIG. 1.

As illustrated, method 250 begins at operation 252, where an indication associated with one or more user activity signals is received. For example, the indication is received from a user signal processor, such as user signal processor 118 in FIG. 1. As another example, the set of user signals is received from a remote computing device (e.g., computing device 104 in FIG. 1), as may be the case when method 250 is performed by a server device (e.g., server device 102). Thus, it will be appreciated that aspects of method 250 may be performed local to a user's computing device, remote from a user's computing device, or a combination thereof.

Flow progresses to operation 254, where a task path is identified from a path data store (e.g., path data store 110 in FIG. 1). As noted above, the task path may be identified based on determining the indicated user activity signal(s) correspond to a task path that corresponds to or otherwise matches a task path in the path data store. In examples, a task path is generated based on the received user activity signal(s) such that the generated task path is used to identify one or more task paths from the path data store accordingly.

Moving to determination 256, it is determined whether the user activity signal(s) differ from the task path that was identified from the path data store. In examples, the comparison includes evaluating a confidence level that the identified task path corresponds to the user activity signals, such that a task path having a low associated confidence level may be determined not to indicate that the user has diverged from the identified task path. As another example, only a subpart of the user activity signals may correspond to the task path, such that it is determined that one or more other user activity signals correspond to a divergence from the identified task path. If it is determined that the user activity does not differ from the task path, flow branches "NO" and terminates at operation 258.

If it is instead determined that the user activity differs from the identified task path, flow branches "YES" to operation 260, where a recommendation is generated based on the identified path. In examples, the recommendation is generated based on a subsequent node of the identified task path, which may have an edge in the task path that associates the subsequent node to a previous node for which corresponding user activity signal(s) have been identified. Thus, the generated recommendation may include a set of actions that are next in the task path and/or that will return the user to the identified task path, thereby facilitating task completion.

While method 250 is illustrated as an example in which operation 254 is used to identify an existing task path from a path data store, it will be appreciated that a machine learning model may additionally or alternatively be used to categorize the user activity signal(s) and/or to generate one or more subsequent actions based on the user activity signal(s) according to aspects described herein. For example, operation 254 and determination 256 may alternatively, or additionally, comprise determining whether the user activity signals are indicative of a positive or a negative task path (e.g., using a machine learning model), such that, if it is determined at determination 256 that the user activity signals are indicative of a negative task path, a subsequent action is generated as the recommendation at operation 260 and provided to the user accordingly.

Flow progresses to operation 262, where an indication of the generated recommendation is provided. In an example where the user activity signal(s) were obtained from a remote computing device, operation 262 comprises transmitting the user activity recommendation in response to the received user activity signal(s). As another example, the recommendation is provided as any of a variety of output, including, but not limited to, natural language output, as a tutorial video that includes a graphical representation of a user interface and corresponding actions, and/or as one or more tooltips that are displayed in association with corresponding user interface elements with which the user is to interact. As illustrated, method 250 terminates at operation 262.

Figure 3A:
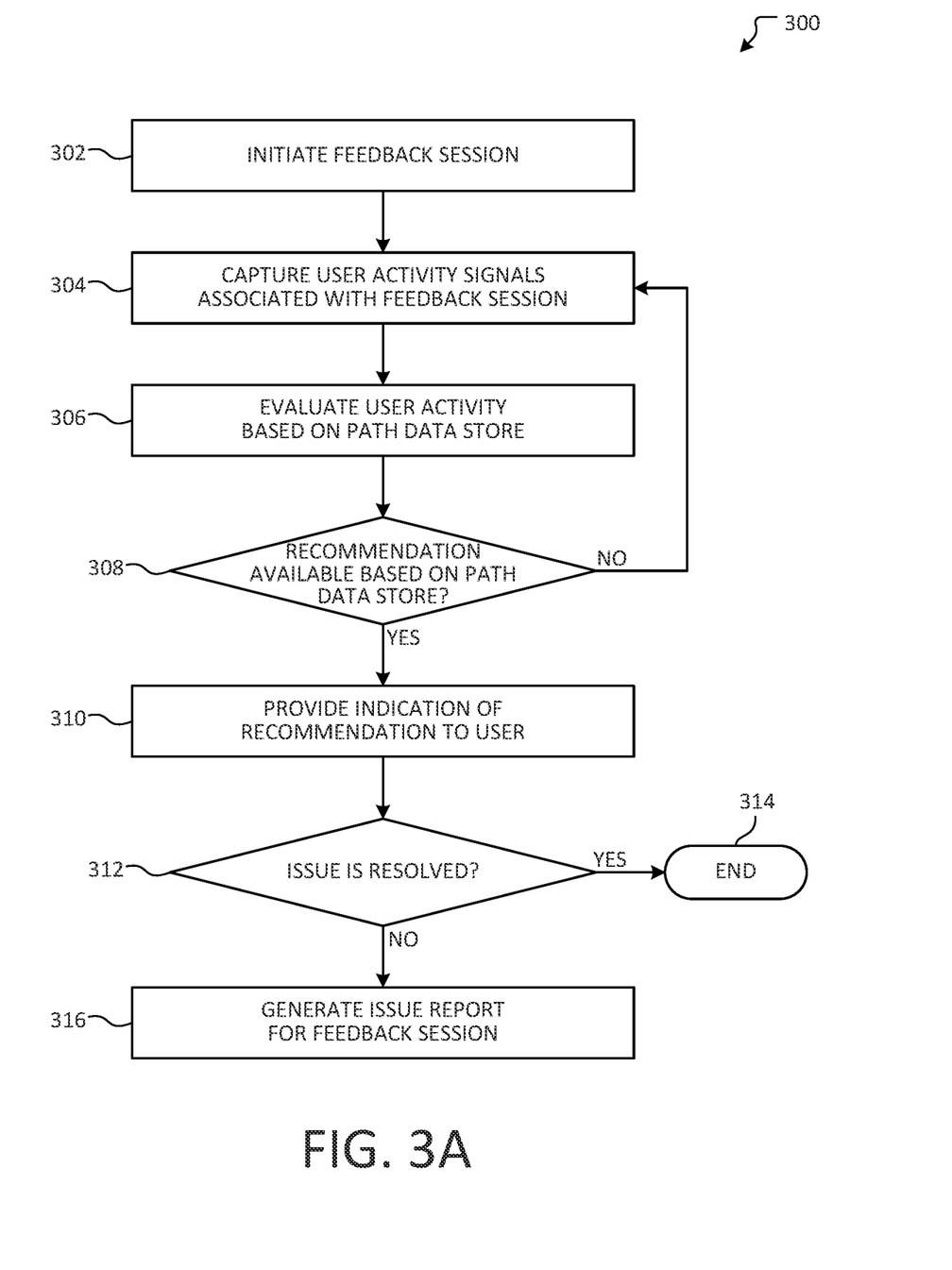
FIG. 3A illustrates an overview of an example method for generating a user activity recommendation based on a feedback session according to aspects described herein.

FIG. 3A illustrates an overview of an example method 300 for generating a user activity recommendation based on a feedback session according to aspects described herein. In examples, aspects of method 300 are performed by a user signal processor and/or a recommendation framework, such as user signal processor 118 and recommendation framework 120 in FIG. 1.

As illustrated, method 300 begins at operation 302, where a feedback session is initiated. For example, a user may actuate a user interface element of an application associated with requesting support and/or may open or otherwise access feedback functionality of an operating system, among other examples. As another example, the user inputs a keyboard shortcut, a voice command, or a gesture associated with initiating the feedback session. It will therefore be appreciated that any of a variety of input may be recognized to initiate the feedback session according to aspects described herein.

At operation 304, user activity signals associated with the feedback session are captured. In examples, aspects of operation 304 are performed by a user signal processor, such as user signal processor 118 described above with respect to FIG. 1. As an example, operation 304 comprises generating a screen recording comprising one or more images and/or frames of video data. Additionally, or alternatively, operation 304 comprises processing telemetry data that is generated by an application (e.g., application 116 in FIG. 1) and/or by an operating system of a computing device, among other examples. It will therefore be appreciated that any of a variety of user activity signals may be processed according to aspects described herein.

Flow progresses to operation 306 where the user activity signals are evaluated based on a path data store (e.g., path data store 110 in FIG. 1). For example, similar to operation 254 of method 250 discussed above with respect to FIG. 2B, a task path may be identified from the path data store based on determining the indicated user activity signal(s) correspond to a task path in the path data store. As noted above, a task path may be generated based on the captured user activity signal(s), such that the generated task path is used to identify one or more task paths from the path data store accordingly.

Accordingly, at determination 308, it is determined whether a user activity recommendation can be generated based on the path data store. For example, similar to aspects discussed above with respect to determination 256, a confidence level that a task path identified with the path data store corresponds to the user activity signals may be evaluated, such that it may be determined that a recommendation is not available if a task path having a low associated confidence level was identified at operation 306. In such an example, method 300 returns to operation 304, such that flow loops between operations 304, 306, and 308 until a task path having a higher confidence level is identified (which may be the same or a different task path than a task path that was identified by a previous iteration of operations 304, 306, and 308). As noted above, only a subpart of the user activity signals may correspond to an identified task path, such that it is determined that a recommendation can be generated based on one or more subsequent nodes of the task path (e.g., relating to a divergence from the task path of the path data store).

Similar to method 250, it will be appreciated that a machine learning model may additionally or alternatively be used to categorize the captured user activity signal(s) and/or to generate one or more subsequent actions based on the user activity signal(s) (e.g., such that it is determined that a recommendation is available at determination 308) according to aspects described herein. For example, operation 306 and determination 308 may alternatively, or additionally, comprise determining whether the user activity signals are indicative of a positive or a negative task path (e.g., using a machine learning model), such that, if it is determined at determination 308 that the user activity signals are indicative of a negative task path, a subsequent action is generated as the recommendation that is provided to the user accordingly at operation 310.

Flow progresses to operation 310, where an indication of the recommendation is provided. Aspects of operation 310 may be similar to those discussed above with respect to operation 262 and are therefore not necessarily redescribed in detail. For example, operation 310 may comprise providing natural language output, a tutorial video that includes a graphical representation of a user interface and corresponding actions, and/or one or more tooltips that are displayed in association with corresponding user interface elements with which the user is to interact. It will therefore be appreciated that any of a variety of techniques may be used to provide a user activity recommendation according to aspects described herein.

At determination 312, it is determined whether the user's issue is resolved. For example, an indication (e.g., to end the feedback session) may be received, such that it is determined that the user's issue is resolved. Additionally, or alternatively, it may be determined that the user's task has been completed (e.g., as a result of determining that a task path identified from the path data store has been completed).

If it is determined that the issue is resolved, flow branches "YES" and ends at operation 314. Thus, a user activity recommendation resulting from the feedback session is used to resolve the user's issue without submitting an issue report (e.g., as would have instead been submitted at operation 316, discussed below) and avoids further troubleshooting activity (e.g., at the user's device and/or at a remote computing device). Such aspects may improve an associated user experience and/or may reduce the technical support burden placed on developers and/or on information technology professionals, among other examples.

By contrast, if it is determined that the issue is not resolved, flow instead branches "NO" to operation 316, where an issue report is generated for the feedback session. For example, the issue report comprises at least a part of the user activity signals that were captured at operation 304. In examples, the issue report is transmitted to a remote computing device (e.g., server device 102 in FIG. 1), thereby enabling subsequent debugging/diagnoses to be performed (e.g., by a software developer). As illustrated, method 300 terminates at operation 316.

It will be appreciated that, in some examples, multiple iterations of operation 310 are performed, for example to iteratively troubleshoot the user's issue. As an example, additional user activity signals are captured prior to each subsequent iteration of operation 310, thereby increasing the information with which a user activity recommendation can be generated. Additionally, or alternatively, input from the user may be requested at operation 304, for example including a natural language description of the issue and/or of an intent and/or task at hand.

Figure 3B:
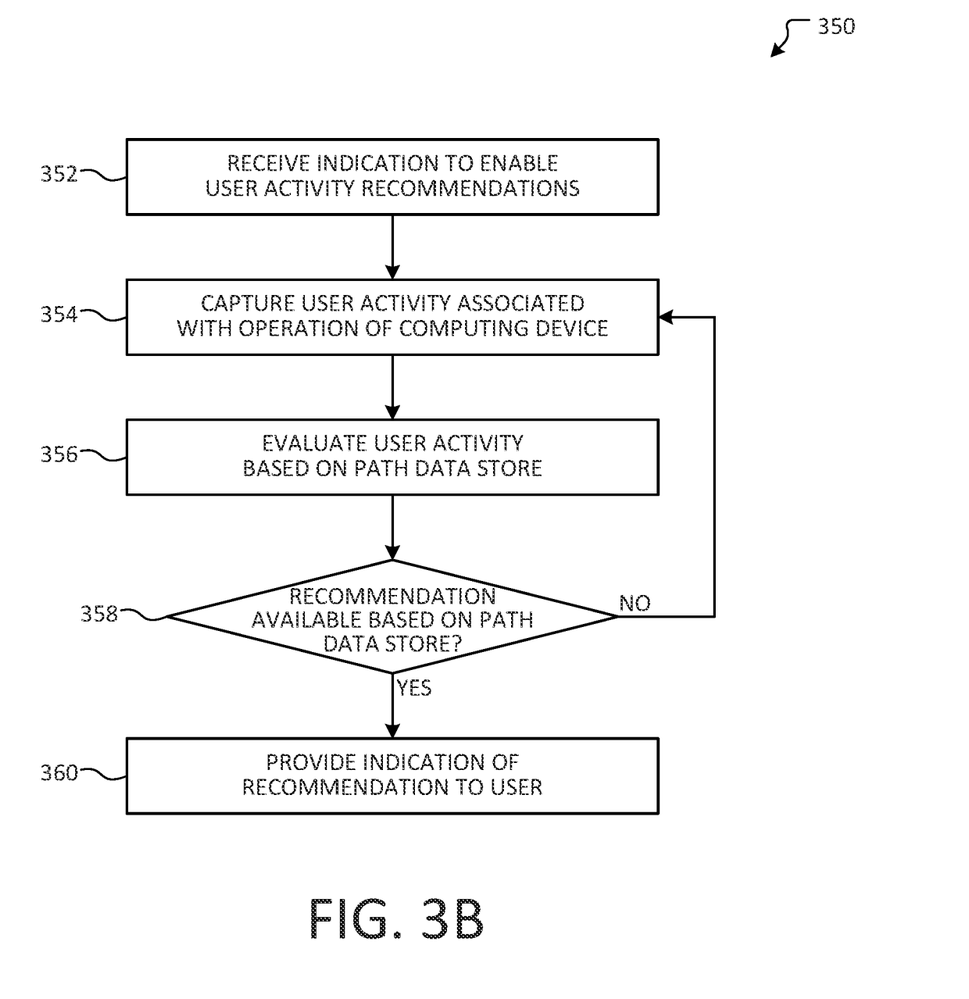
FIG. 3B illustrates an overview of an example method for proactively generating a user activity recommendation according to aspects described herein.

FIG. 3B illustrates an overview of an example method 350 for proactively generating a user activity recommendation according to aspects described herein. In examples, aspects of method 350 are performed by a user signal processor and/or a recommendation framework, such as user signal processor 118 and recommendation framework 120 in FIG. 1.

As illustrated, method 350 begins at operation 352, where an indication to enable user activity recommendations is received. For example, the indication may be received as a result of a user actuating a user interface element of a preference pane for an application or of an operating system, among other examples. As a further example, a prompt is generated (e.g., when the application is launched for the first time or after an update) that asks whether the user would like to enable user activity recommendations, such that an indication to enable user activity recommendations is received therefrom.

In examples, the disclosed aspects are used to provide guidance/troubleshooting for a third-party application, with little to no change needed for the third-party application. For instance, the disclosed aspects may be applied to an application that is distributed via a digital distribution platform for computer software (e.g., as may be included by an operating system). It will thus be appreciated that an indication to enable user activity recommendations may be received as any of a variety of user inputs.

At operation 354, user activity signals are captured. As compared to operation 304 discussed above with respect to method 300 in FIG. 3A, operation 354 may comprise capturing user activity signals in a broader context (e.g., outside of a specific set of applications and/or windows), as may be the case when user activity recommendations were enabled at an operating system level. As another example, operation 354 captures user activity signals associated with an application for which the indication to enable user activity recommendations was received.

In examples, aspects of operation 354 are performed by a user signal processor, such as user signal processor 118 described above with respect to FIG. 1. As an example, operation 354 comprises generating a screen recording comprising one or more images and/or frames of video data. Additionally, or alternatively, operation 354 comprises processing telemetry data that is generated by an application (e.g., application 116 in FIG. 1) and/or by an operating system of a computing device, among other examples. It will therefore be appreciated that any of a variety of user activity signals may be processed according to aspects described herein.

Flow progresses to operation 356 where the user activity signals are evaluated based on a path data store (e.g., path data store 110 in FIG. 1). For example, similar to operation 254 of method 250 discussed above with respect to FIG. 2B, a task path may be identified from the path data store based on determining the indicated user activity signal(s) correspond to a task path in the path data store. As noted above, a task path may be generated based on the captured user activity signal(s), such that the generated task path is used to identify one or more task paths from the path data store accordingly.

Accordingly, at determination 358, it is determined whether a user activity recommendation can be generated based on the path data store. For example, similar to aspects discussed above with respect to determination 256 of method 250 in FIG. 2B, a confidence level that a task path identified with the path data store corresponds to the user activity signals may be evaluated, such that it may be determined that a recommendation is not available if a task path having a low associated confidence level was identified at operation 356. In such an example, method 350 returns to operation 354, such that flow loops between operations 354, 356, and 358 until a task path having a higher confidence level is identified (which may be the same or a different task path than a task path that was identified by a previous iteration of operations 356, 356, and 358). As noted above, only a subpart of the user activity signals may correspond to an identified task path, such that it is determined that a recommendation can be generated based on one or more subsequent nodes of the task path (e.g., relating to a divergence from the task path of the path data store).

Similar to method 250 and/or 300, it will be appreciated that a machine learning model may additionally or alternatively be used to categorize the captured user activity signal(s) and/or to generate one or more subsequent actions based on the user activity signal(s) (e.g., such that it is determined that a recommendation is available at determination 358) according to aspects described herein. For example, operation 356 and determination 358 may alternatively, or additionally, comprise determining whether the user activity signals are indicative of a positive or a negative task path (e.g., using a machine learning model), such that, if it is determined at determination 358 that the user activity signals are indicative of a negative task path, a subsequent action is generated as the recommendation at operation 360 and provided to the user accordingly.

Flow progresses to operation 360, where an indication of the recommendation is provided. Aspects of operation 360 may be similar to those discussed above with respect to operation 262 and are therefore not necessarily redescribed in detail. For example, operation 360 may comprise providing natural language output, a tutorial video that includes a graphical representation of a user interface and corresponding actions, and/or one or more tooltips that are displayed in association with corresponding user interface elements with which the user is to interact. It will therefore be appreciated that any of a variety of techniques may be used to provide a user activity recommendation according to aspects described herein. As illustrated, method 350 terminates at operation 360.

In examples, implicit and/or explicit feedback associated with a recommendation is used as training data with which to improve performance of a machine learning model according to aspects described herein. For example, such feedback may be collected or otherwise obtained in association with a recommendation that was provided to a user (e.g., at operation 310 or operation 360 in FIGS. 3A and 3B, respectively). Thus, model performance may improve over time as a result of feedback signals that are received from a population of users to which user activity recommendations are provided.

Figure 4:
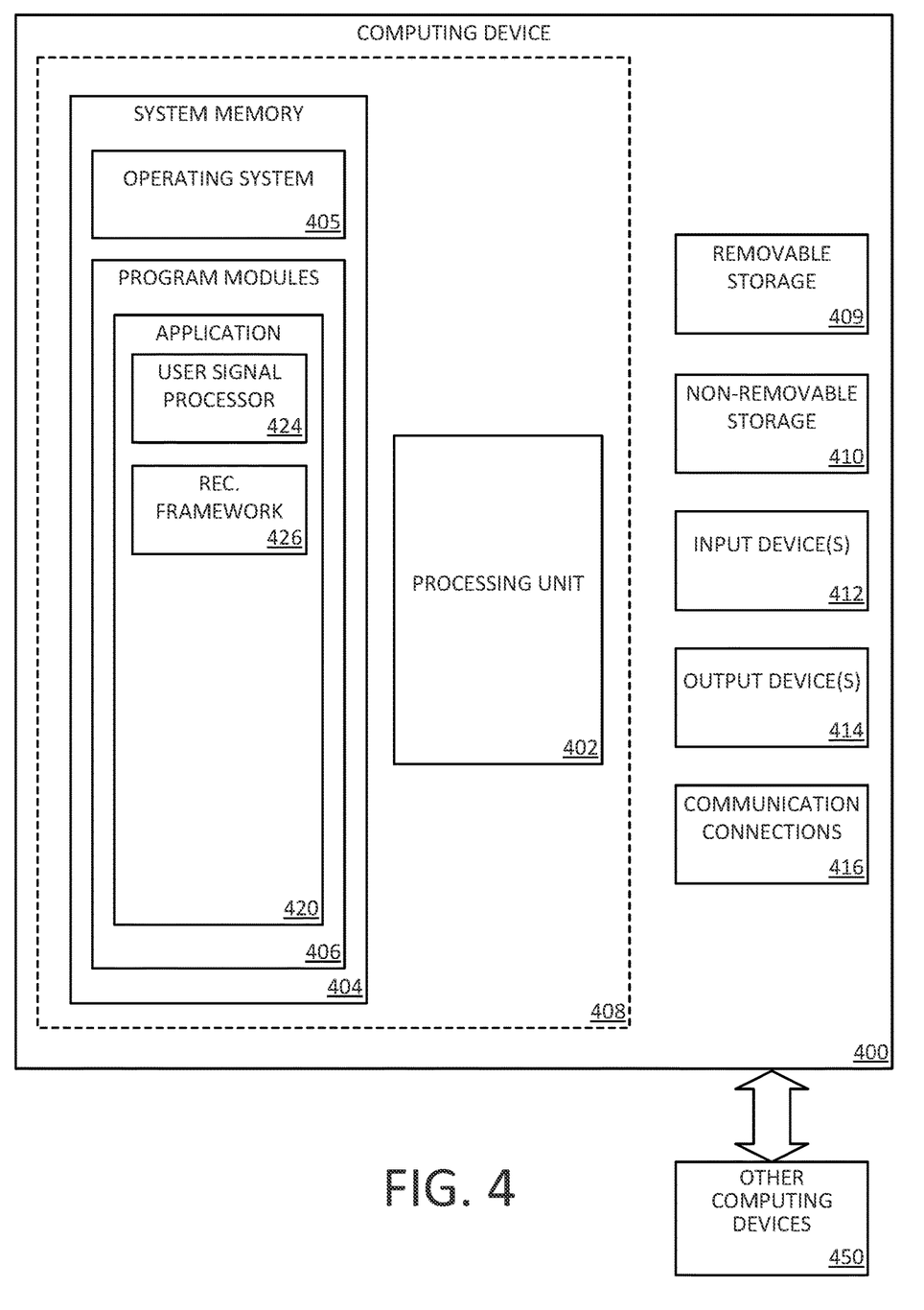
FIG. 4 is a block diagram illustrating example physical components of a computing device with which aspects of the disclosure may be practiced.
Figure 5:
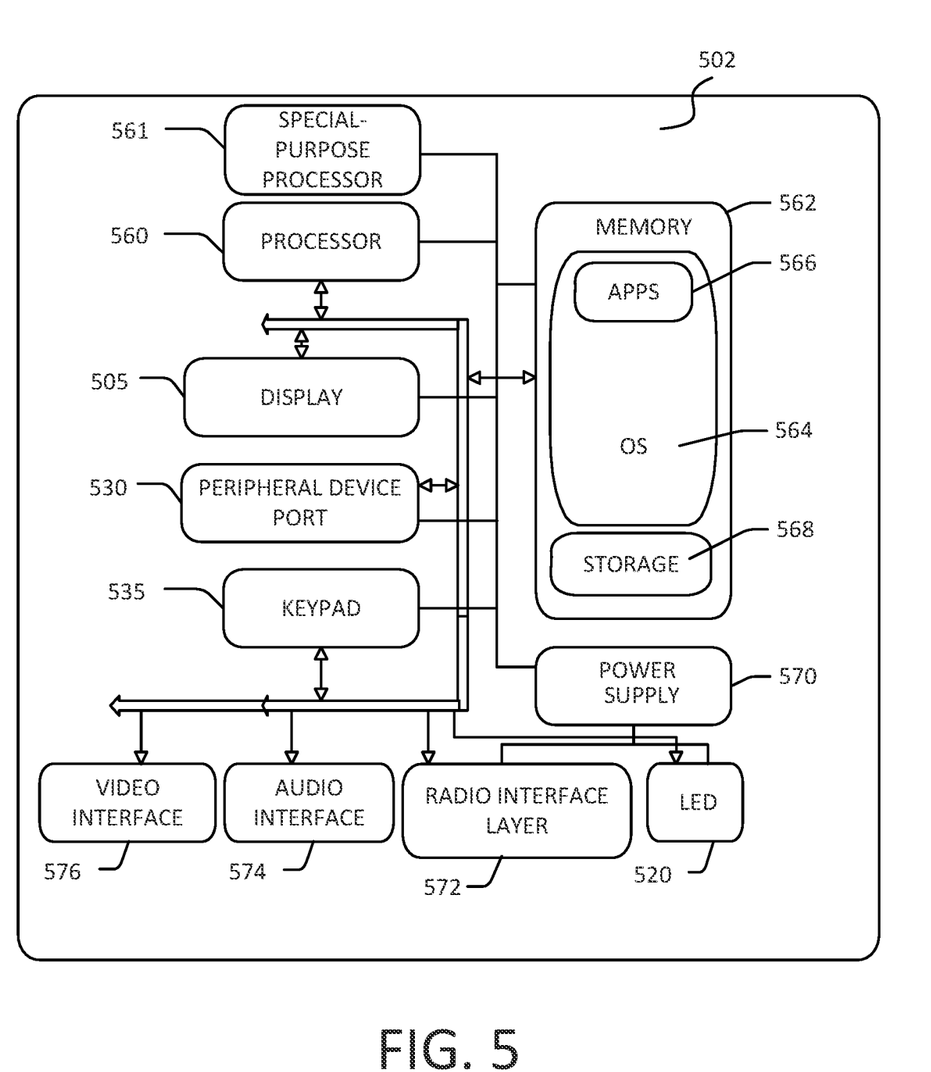
FIG. 5 is a simplified block diagram of a mobile computing device with which aspects of the present disclosure may be practiced.
Figure 6:
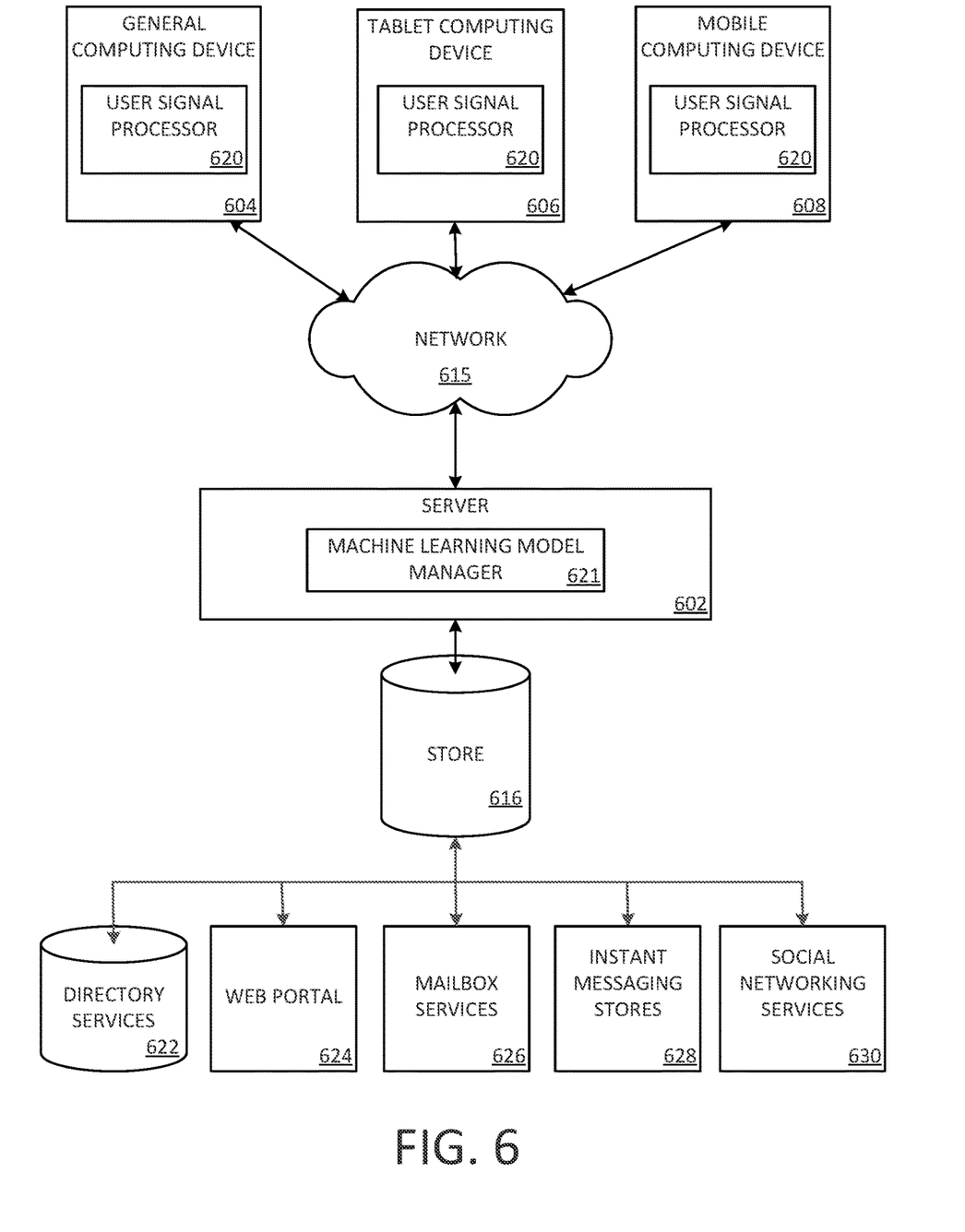
FIG. 6 is a simplified block diagram of a distributed computing system in which aspects of the present disclosure may be practiced.

FIGS. 4-6 and the associated description provides a discussion of an operating environment in which aspects of the disclosure may be practiced. However, illustrated aspects are for purposes of example and illustration and are not limiting of a vast number of computing device configurations that may be utilized for practicing aspects of the disclosure, described herein.

FIG. 4 is a block diagram illustrating physical components (e.g., hardware) of a computing device 400 with which aspects of the disclosure may be practiced. The computing device components described below may be suitable for the computing devices described above, including devices 102 and 104 in FIG. 1. In examples, computing device 400 may be a mobile telephone, a smart phone, wearable computer (such as a smart watch), a tablet computer, a laptop computer, and the like, with which embodiments of the disclosure may be practiced. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. As examples, system memory 404 may store user signal processor 424 and recommendation framework 426. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 5 is a block diagram illustrating the architecture of one aspect of a computing device. That is, the computing device can incorporate a system (e.g., an architecture) 502 to implement some aspects. In some examples, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., a region predictor, a scaling engine, etc.).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and/or special-purpose processor 561 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with aspects of the present disclosure, the microphone may also serve as an audio sensor to facilitate control of notifications, as will be described below. The system 502 may further include a video interface 576 that enables an operation of an on-board camera 530 to record still images, video stream, and the like.

A computing device implementing the system 502 may have additional features or functionality. For example, the computing device may also include additional data storage devices (removable and/or non-removable) such as, magnetic disks, optical disks, or tape. Such additional storage is illustrated in FIG. 5 by the non-volatile storage area 568.

Data/information generated or captured by the computing device and stored via the system 502 may be stored locally on the computing device, as described above, or the data may be stored on any number of storage media that may be accessed by the device via the radio interface layer 572 or via a wired connection between the computing device and a separate computing device associated with the computing device, for example, a server computer in a distributed computing network, such as the Internet. As should be appreciated such data/information may be accessed via the computing device via the radio interface layer 572 or via a distributed computing network. Similarly, such data/information may be readily transferred between computing devices for storage and use according to well-known data/information transfer and storage means, including electronic mail and collaborative data/information sharing systems.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

A user signal processor 620 may be employed by a client that communicates with server device 602. Additionally, or alternatively, machine learning model manager 621 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

It will be appreciated that, as another example, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining a set of user activity signals associated with a task being performed by a user; determining, based on the set of user activity signals, a subsequent action for completing the task being performed by the user; generating, based on the determined subsequent action, a user activity recommendation; and presenting, to the user, the user activity recommendation. In an example, the set of user activity signals is obtained in response to the user initiating a feedback session; the set of user activity signals includes user activity for an application associated with the feedback session; and the set of operations comprises presenting the user activity recommendation instead of generating an issue report for the feedback session. In another example, the set of user activity signals comprises at least one of a screen recording of the application or telemetry data associated with the application. In a further example, determining the subsequent action for completing the task comprises: identifying, from a path data store, a task path corresponding the set of user activity signals; and identifying, from the task path and based on the set of user activity signals, a subsequent node of the task path that includes the subsequent action. In yet another example, determining the subsequent action for completing the task comprises: processing, using a generative machine learning model, the set of user activity signals to generate model output that includes the subsequent action. In a further still example, the processing the set of user activity signals comprises providing a prompt to the generative machine learning model that includes an indication of a positive task path corresponding to the task being performed by the user. In another example, the set of user activity signals is obtained in response to the user providing a preference indication to enable user activity recommendations.

In another aspect, the technology relates to a method for generating a user activity recommendation. The method comprises: obtaining a set of user activity signals associated with a task being performed by a user; generating, based on the set of user activity signals, a task path for the task being performed by the user; determining, based on the generated task path, whether the user has diverged from a positive task path for completing the task being performed by the user; and based on determining the user has diverged from the positive task path: generating, based on the positive task path, a user activity recommendation; and presenting, to the user, the user activity recommendation. In an example, the set of user activity signals is obtained in response to at least one of the user initiating a feedback session or the user providing a preference indication to enable user activity recommendations. In another example, generating the user activity recommendation comprises: identifying, from a path data store and based on the generated task path, the positive task path; and identifying, from the positive task path, a subsequent node that includes a subsequent action to include in the user activity recommendation. In a further example, generating the user activity recommendation comprises: providing, to a generative machine learning model, a prompt that includes an indication of the positive task path, thereby inducing the generative machine learning model to generate a subsequent action for completing the task. In yet another example, presenting the user activity recommendation comprises at least one of: providing natural language output indicating a subsequent action for completing the task; providing a tutorial video that includes a graphical representation of a user interface and the subsequent action; or providing a tooltip that is displayed in association with a user interface element that corresponds to the subsequent action. In a further still example, the set of user activity signals comprises at least one of a screen recording of the application or telemetry data associated with the application.

In a further aspect, the technology relates to another method for generating a user activity recommendation. The method comprises: obtaining a set of user activity signals associated with a task being performed by a user; determining, based on the set of user activity signals, a subsequent action for completing the task being performed by the user; generating, based on the determined subsequent action, a user activity recommendation; and presenting, to the user, the user activity recommendation. In an example, the set of user activity signals is obtained in response to the user initiating a feedback session; the set of user activity signals includes user activity for an application associated with the feedback session; and the method further comprises presenting the user activity recommendation instead of generating an issue report for the feedback session. In another example, the set of user activity signals comprises at least one of a screen recording of the application or telemetry data associated with the application. In a further example, determining the subsequent action for completing the task comprises: identifying, from a path data store, a task path corresponding the set of user activity signals; and identifying, from the task path and based on the set of user activity signals, a subsequent node of the task path that includes the subsequent action. In yet another example, determining the subsequent action for completing the task comprises: processing, using a generative machine learning model, the set of user activity signals to generate model output that includes the subsequent action. In a further still example, the processing the set of user activity signals comprises providing a prompt to the generative machine learning model that includes an indication of a positive task path corresponding to the task being performed by the user. In another example, the set of user activity signals is obtained in response to the user providing a preference indication to enable user activity recommendations.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, causes the system to perform a set of operations, the set of operations comprising:
obtaining a set of user activity signals associated with a task being performed by a user;
processing, using a generative machine learning model and based on a prompt that indicates a positive task path corresponding to completing the task, the set of user activity signals to generate model output that includes a subsequent action for completing the task being performed by the user;
generating, based on the subsequent action, a user activity recommendation; and
presenting, to the user, the generated user activity recommendation.

2. The system of claim 1, wherein:
the set of user activity signals is obtained in response to the user initiating a feedback session;
the set of user activity signals includes user activity for an application associated with the feedback session; and
the set of operations comprises presenting the generated user activity recommendation instead of generating an issue report for the feedback session.

3. The system of claim 2, wherein the set of user activity signals comprises at least one of a screen recording of the application or telemetry data associated with the application.

4. The system of claim 1, wherein the set of operations comprises:
identifying, from a path data store, the positive task path corresponding the set of user activity signals; and
generating the prompt that indicates the positive task path.

5. The system of claim 4, wherein the indication of the positive task path indicates a subsequent node of the identified positive task path.

6. The system of claim 4, wherein the positive task path is identified based on a task path representing the user activity signals for the task being performed by the user.

7. The system of claim 1, wherein the set of user activity signals is obtained in response to the user providing a preference indication to enable user activity recommendations.

8. A method for generating a user activity recommendation, the method comprising:
obtaining a set of user activity signals associated with a task being performed by a user;
generating, based on the set of user activity signals, a task path for the task being performed by the user;
determining, based on the generated task path, whether the user has diverged from a positive task path for completing the task being performed by the user; and
based on determining the user has diverged from the positive task path:
generating, using a generative machine learning model and based on a prompt that includes an indication of the positive task path, a user activity recommendation that includes a subsequent action for completing the task; and
presenting, to the user, the generated user activity recommendation.

9. The method of claim 8, wherein the set of user activity signals is obtained in response to at least one of the user initiating a feedback session or the user providing a preference indication to enable user activity recommendations.

10. The method of claim 8, wherein generating the user activity recommendation comprises:
identifying, from a path data store and based on the generated task path, the positive task path; and
generating the prompt comprising an indication of the identified positive task path.

11. The method of claim 8, wherein presenting the generated user activity recommendation comprises at least one of:
providing natural language output indicating a subsequent action for completing the task;
providing a tutorial video that includes a graphical representation of a user interface and the subsequent action; or
providing a tooltip that is displayed in association with a user interface element that corresponds to the subsequent action.

12. The method of claim 8, wherein the set of user activity signals comprises at least one of a screen recording of an application or telemetry data associated with the application.

13. A method for generating a user activity recommendation, the method comprising:
obtaining a set of user activity signals associated with a task being performed by a user;
processing, using a generative machine learning model and based on a prompt that indicates a positive task path corresponding to completing the task, the set of user activity signals to generate model output that includes a subsequent action for completing the task being performed by the user;
generating, based on the subsequent action, a user activity recommendation; and
presenting, to the user, the generated user activity recommendation.

14. The method of claim 13, wherein:
the set of user activity signals is obtained in response to the user initiating a feedback session;
the set of user activity signals includes user activity for an application associated with the feedback session; and
the method further comprises presenting the generated user activity recommendation instead of generating an issue report for the feedback session.

15. The method of claim 14, wherein the set of user activity signals comprises at least one of a screen recording of the application or telemetry data associated with the application.

16. The method of claim 13, wherein processing the set of user activity signals comprises:

identifying, from a path data store, the positive task path corresponding the set of user activity signals; and generating the prompt that indicates the positive task path.

17. The method of claim 16, wherein the indication of the positive task path indicates a subsequent node of the identified positive task path.

18. The method of claim 16, wherein the positive task path is identified based on a task path representing the user activity signals for the task being performed by the user.

19. The method of claim 13, wherein the set of user activity signals is obtained in response to the user providing a preference indication to enable user activity recommendations.

20. The method of claim 13, wherein presenting the generated user activity recommendation comprises at least one of:

provoding natural language output indicating a subsequent action for completing the task;

providing a tutorial video that includes a graphical representation of a user interface and the subsequent action; or providing a tooltip that is displayed in association with a user interface element that corresponds to the subsequent action.

\* \* \* \* \*